(12) United States Patent
Mietlicki

(10) Patent No.: US 6,394,327 B1
(45) Date of Patent: May 28, 2002

(54) TWO-PART PUSH-BROOM LOCKING SYSTEM

(76) Inventor: Richard Mietlicki, 8220 Lincoln Ave., Lockport, NY (US) 14094

( * ) Notice: Subject to any disclaimer, the term of this patent is extended or adjusted under 35 U.S.C. 154(b) by 0 days.

(21) Appl. No.: 09/655,050

(22) Filed: Sep. 5, 2000

(51) Int. Cl.[7] .................................................. B60R 7/00
(52) U.S. Cl. ........................ 224/547; 224/401; 224/517; 224/535; 224/557; 224/569; 15/146; 211/66; 248/201
(58) Field of Search ................................ 224/401, 402, 224/403, 517, 533, 535, 537, 543, 547, 548, 552, 557, 567, 569, 571; 15/146; 211/65, 66, 70.1; 248/110, 111, 113, 201

(56) References Cited

U.S. PATENT DOCUMENTS

| | | | | |
|---|---|---|---|---|
| 1,262,920 A | * | 4/1918 | Chouvaldjy | ............. 248/201 X |
| 3,063,569 A | * | 11/1962 | Huber | ....................... 211/66 X |
| 3,105,666 A | * | 10/1963 | Orr | .............................. 248/201 |
| 3,432,133 A | * | 3/1969 | Schmid | ........................ 248/201 |
| 3,980,217 A | * | 9/1976 | Yochum | .................... 224/42.04 |
| 4,009,853 A | * | 3/1977 | Lile | ............................. 248/201 |
| 5,411,191 A | * | 5/1995 | Bunn, Jr. | ............... 24/42.42 X |
| 6,044,984 A | * | 4/2000 | Crosby et al. | ............. 211/70.6 |

* cited by examiner

*Primary Examiner*—Stephen K. Cronin
(74) *Attorney, Agent, or Firm*—Wallace F. Neyerlin

(57) ABSTRACT

A two part locking system for a push-broom preferably for use in the trucking industry, the first part A being mounting bracket with means for being fixedly attached to a desired site; such as on the rear panel of the cab, generally along the driver's side thereof, or to the tractor trailer in any suitable and accessible location thereon; and the second part B being a coupling piece that is attached to the push-broom at its wooden surface base containing the bristles and also to the handle of the broom, extending longitudinally up the broom handle from the broom base.

7 Claims, 4 Drawing Sheets

TWO-PART PUSH-BROOM LOCKING SYSTEM

BACKGROUND OF THE INVENTION

The present invention relates generally to a vehicular mounted carrier for implements and particularly relates to a two-part locking system for a "push-broom" for the trucking industry.

There are many truck drivers who find it expedient or necessary to carry special purposes implements with their vehicle for incidental usage in the ordinary course of their operations. For example, many truckers find it advantageous to have handy a "push-broom" for periodic use. Such an implement, especially with trucks used for purposes of general utility, is often found desirable when loading and unloading the truck and/or for periodic cleaning of the cargo compartment thereof.

It is known, however, that the carrying of an implement such as a push-broom or any similar implement having an appreciable length, constitutes a problem as ordinarily there is no convenient, secure place on or in the vehicle to receive or hold this general type of implement.

Generally, the cab of the truck is too small to conveniently hold such an implement without obstructing or interfering with the safe operation of the vehicle. In addition, if laid loosely in the truck cab, the implement is likely to bounce around, presenting further hindrance and discomfort to the driver.

Similar objections as to the implement bouncing around may be made to the carrying of the implement in the rear or cargo compartment of the truck if there is no special support for the implement. This location may prove further objectionable, particularly in the case of truck-trailers, in that the cargo contained in the trailer may be positioned to block access to the implement. There is the further probability that the implement may be left behind upon switching of the trailer if located in the latter.

It is known also that such implements tend to become lost, either through misplacement or theft, due to the manner in which they are presently carried on the vehicle.

It is to be noted that there are more than a million semi-trailer trucks on the road in the United States and that the trucking companies desire or require that their drivers or their helpers keep their trailers clean, but that theft of their brooms is a common problem; and that the truck drivers often won't buy a new broom for fear that it will get stolen.

SUMMARY OF THE INVENTION

Accordingly, it is a particular object of the invention to provide a two, main-part locking system for a push-broom for the trucking industry; one main part being a mounting bracket or carrier that is attached to a tractor trailer in any suitable and accessible location thereon; and the second main part being a receiver piece that is attached to the broom handle and to the wooden part of the push broom holding the broom bristles.

The mounting bracket is preferably mounted to the rear panel of the cab generally along the driver's side thereof. This location is preferred for reasons of practicality inasmuch as this particular area is ordinarily free of obstruction and is generally of the proper height for accepting a long-handled implement. Furthermore, for purposes of convenience and access, this area is ideal from the driver's viewpoint. The location of the mounting bracket, however, is not critical and, depending on the type of vehicle and the driver's individual preferences, may be mounted in any of a number of other locations.

It is another object of the invention to provide a receiver piece on the broom that is adapted to be easily coupled to or connected to the mounting bracket of the tractor trailer and that can be easily secured thereto by a padlock in order to safeguard the broom against theft.

It is a further object of the invention to provide such a receiver piece on the broom that will serve to provide additional strength to the broom handle particularly at or near the location on the push broom where the elongated handle connects into the portion of the broom that contains the broom bristles.

DETAILED DESCRIPTION OF THE DRAWINGS

Figure 1:
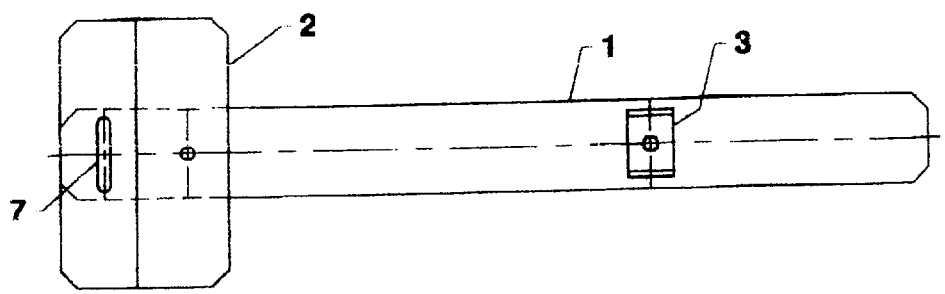
FIG. 1 is a top view of the truck mounting bracket or carrier.
Figure 1A:
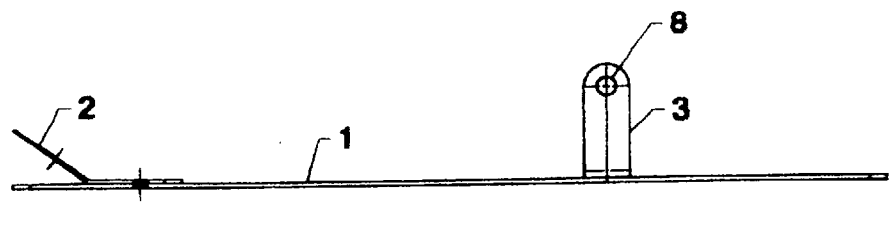
FIG. 1a is a side view of the truck mounting bracket or carrier.
Figure 1B:
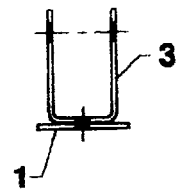
FIG. 1b is a top view of U-shaped coupling means welded or attached to the mounting bracket.

In FIG. 1, numeral 1 denotes the main longitudinal body of the truck mounting bracket, numeral 2 denotes a slightly concave attachment at the base of the mounting bracket, said base having a lateral slot 7 therein to facilitate being coupled to a coupling piece affixed to the push-broom. Numeral 3 in FIG. 1 denotes a U-shaped coupling means attached to the truck mounting bracket from about 12 to about 14 inches from the base of the mounting bracket, said coupling means having a pair of holes 8 therein directly opposite from each other for insertion of a padlock therethrough. Numerals 1, 2, 3, and 8 in FIGS. 1a and/or 1b, designate the same items as referred to in describing FIG. 1. Body 1 of FIG. 1 is preferably made from steel and is typically about 14 to about 20 inches long, about 2 inches wide, and about ¼ inch thick. The slightly concave attachment at the base of the mounting bracket is preferably about 6 inches wide and about 4 inches long as shown in FIG. 1.

Figure 2:
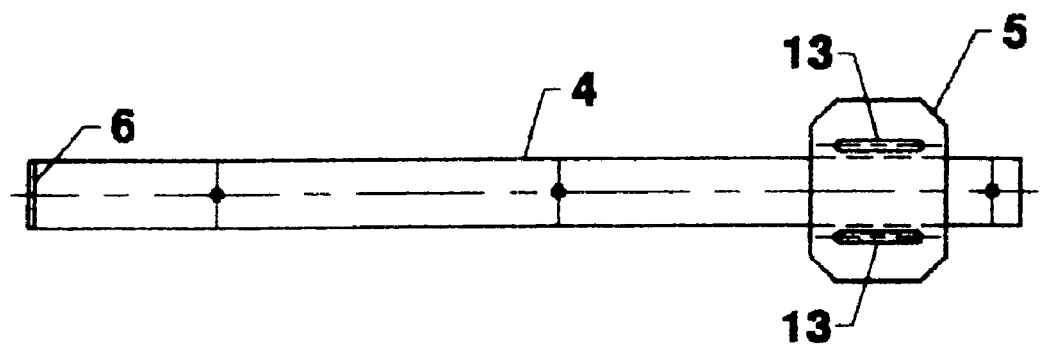
FIG. 2 is a top view of the broom mounting bracket for being attached to the push-broom.
Figure 2A:
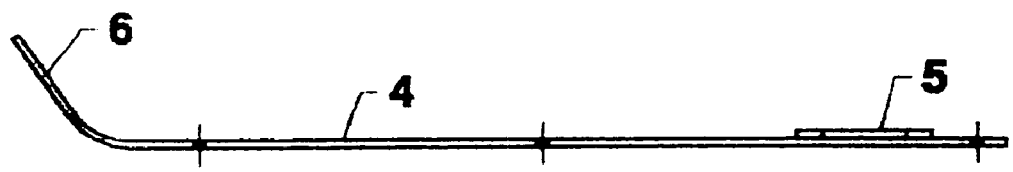
FIG. 2a is a side view of the broom mounting bracket for being attached to the push-broom.
Figure 3C:
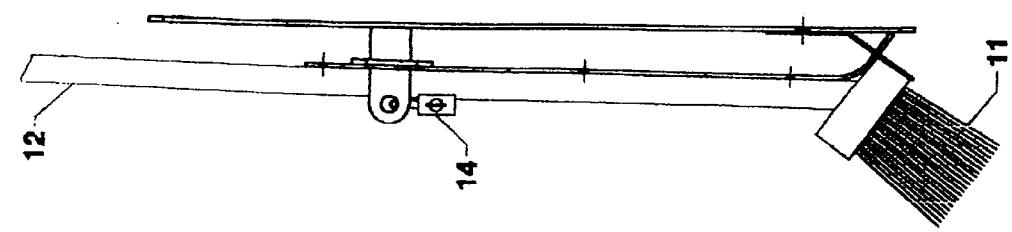
FIG. 3c is a side view showing completed and locked engagement of the push-broom to the truck mounting bracket.
Figure 3B:
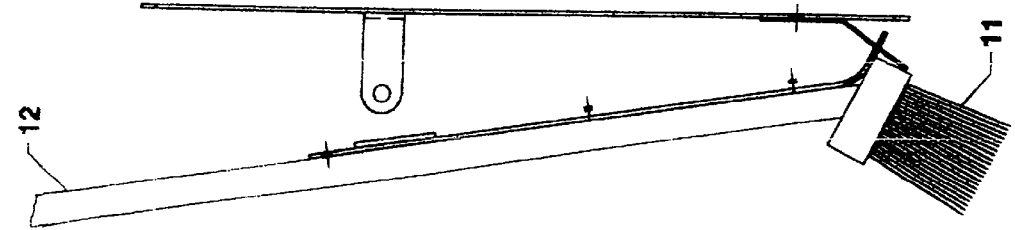
FIG. 3b is a side view showing partial engagement of the push-broom to the truck mounting bracket.
Figure 3A:
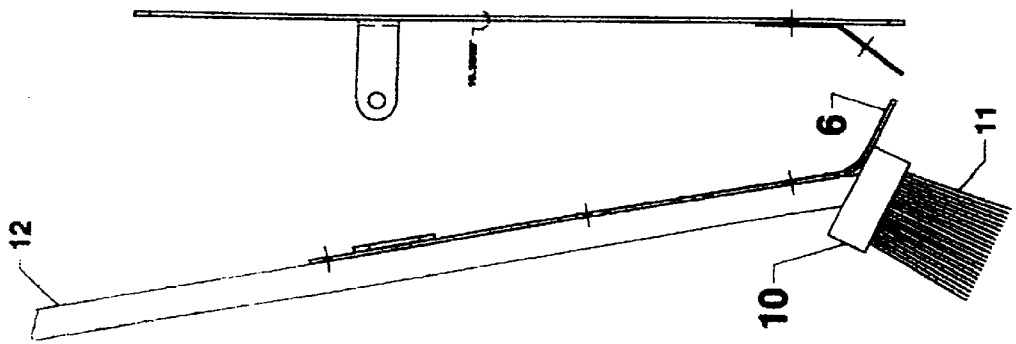
FIG. 3a is a side view of the broom mounting bracket attached to the back-side of the broom handle and is a side view of the truck mounting bracket or carrier; illustrating the sequential steps of the coupling of the broom to the truck mounting bracket or carrier.
Figure 3:
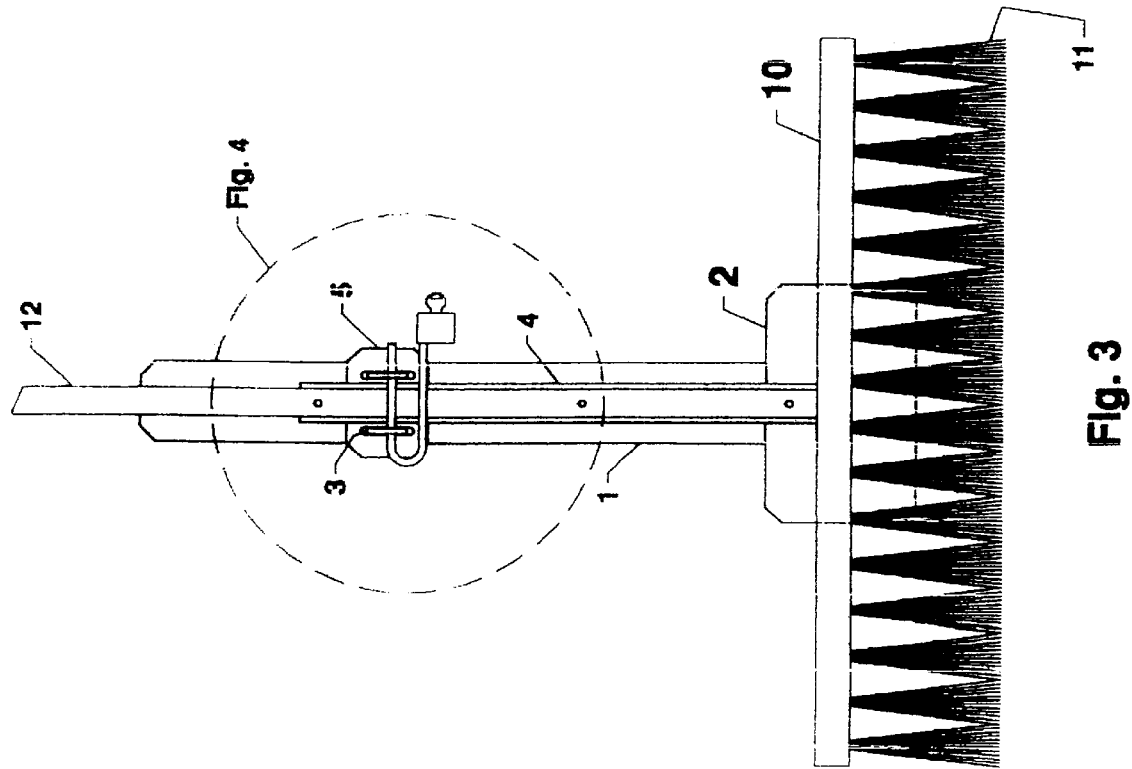
FIG. 3 is a rear schematic view of the push-broom showing the broom mounting bracket attached to the back-side of the broom handle.

In FIG. 2, numeral 4 denotes the coupling piece that is to be attached to the push broom at its wooden surface base 10 containing the bristles 11 (FIGS. 3, 3a, 3b, and 3c) and also to the handle 12 of the broom. Said coupling piece 4 is preferably about 14 inches long and has a tip 6 thereon at its lower end which extends beyond the wooden surface 10 of the broom base for a typical distance of about 1½ to 2 inches. This tip is for being inserted into the lateral slot 7 of the slightly concave attachment 2 at the base of the mounting bracket 1. Coupling piece 4 also has means 5 near its upper end containing a pair of longitudinal slots 13 therein through which the arms of the U-shaped coupling means 3 of bracket part 1 are designed to pass through after which a padlock 14 is passed through the two directly opposite holes 8 of the U-shaped coupling means of the mounting bracket 1 to complete the locking system for the push broom. The unnumbered holes in coupling piece 4 of FIG. 2 are for the insertion of screws spaced from each other along the axis of the broom handle. A screw is also typically used to attach coupling piece part B to the push broom at its wooden surface base containing the bristles. Coupling piece B is preferably made of steel and is about one inch wide along its length except for the means 5 near its upper end containing the longitudinal slots 13 therein, which means is about 2¾ inches wide and wherein the longitudinal slots in same are about 1⅛ inches long and are each located outside the main axis of part B.

Figure 4:
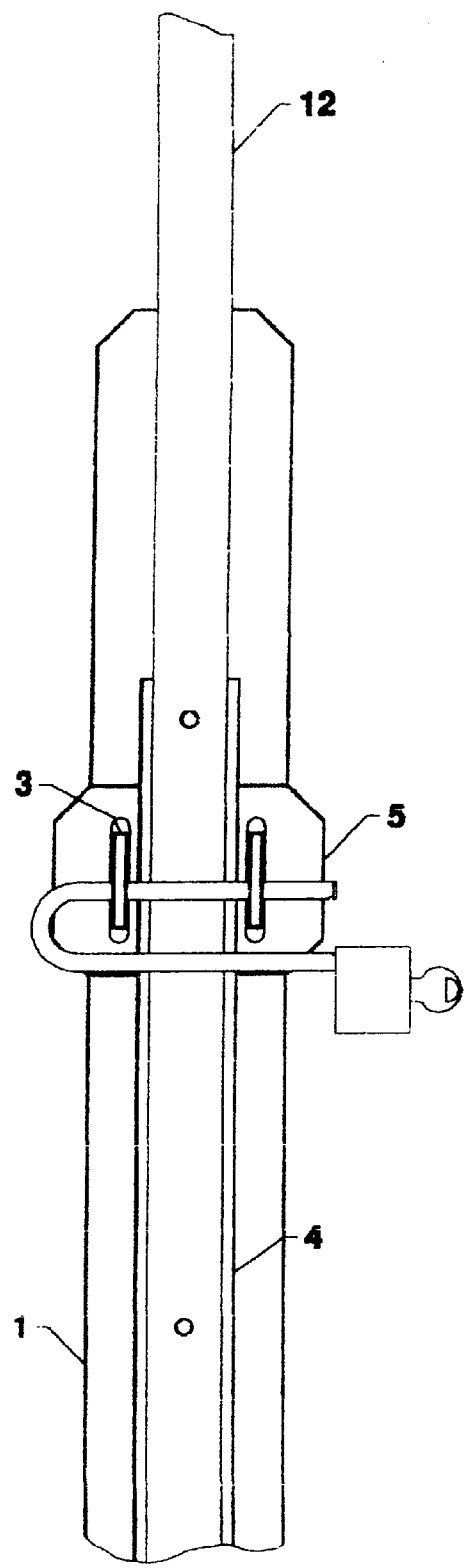
FIG. 4 is a detailed view of the portion of FIG. 3 enclosed by the hyphenated circle of FIG. 3.

The features and parts of what are shown in the drawing sheets containing FIGS. 3, 3a, 1a, 3b, 3c, and shown in FIG. 4 respectively, should be apparent from a review of the discussions set forth in describing the drawing sheets containing FIGS. 1, 1a, 1b, and FIGS. 2 and 2a. Welds and spaced screws are used in making the various attachments indicated.

A two-part push-broom locking system constructed in accordance with the present invention may be used with practically all types of vehicles and installed in a variety of locations, thus providing a highly convenient and practical solution to the problem of releasably carrying unwieldy implements such as push-brooms or shovels and other implements having a lateral rod-like handle portion on a vehicle. Further, many implements may be readily modified for use with the truck mounting carrier. The clamping elements are inexpensive and permit the ready insertion and removal of the implement from the carrier and yet hold the implement in a firm, vibration-free manner.

Various modes of carrying out the present invention are contemplated as being within the scope of the following claims particularly pointing out and distinctly claiming the subject matter regarded as the nature of the invention.

I claim:

1. A two-part locking system for a push-broom, the first part A being a mounting bracket with means for being fixedly attached to a desired site; and the second part B being a coupling piece that is attached to the push-broom at its wooden surface base containing the bristles and also to the handle of the broom, extending longitudinally up the broom handle from the broom base;

said mounting bracket part A having a slightly concave attachment with a lateral slot therein at its base, and said mounting bracket part A also having substantially U-shaped coupling means attached to the bracket part A from about 12 to 18 inches from the bottom of the mounting bracket, said U-shaped coupling means having holes therein directly opposite from each other for insertion of a padlock therethrough;

and said part B having a tip thereon at its lower end extending beyond the wooden surface of the broom base for being inserted into the lateral slot of the slightly concave attachment at the base of the mounting bracket;

and said part B also having means near its upper end containing longitudinal slots therein, through which the arms of the U-shaped coupling means of bracket part A are designed to pass through, after which a padlock is passed through the two directly opposite holes of the U-shaped coupling means of the mounting bracket part A to complete the locking system for the push-broom.

2. A two-part locking system for a push-broom, for use in the trucking industry, the first part A being a mounting bracket with means for being fixedly attached to a desired site; and the second part B being a coupling piece that is attached to the push-broom at its wooden surface base containing the bristles and also to the handle of the broom, extending longitudinally up the broom handle from the broom base;

said mounting bracket part A having a slightly concave attachment with a lateral slot therein at its base, and said mounting bracket part A also having substantially U-shaped coupling means attached to the bracket part A from about 12 to about 18 inches from the bottom of the mounting bracket, said U-shaped coupling means having holes therein directly opposite from each other for insertion of a padlock therethrough;

and said part B having a tip thereon at its lower end and extending beyond the wooden surface of the broom base for being inserted into the lateral slot of the slightly concave attachment at the base of the mounting bracket;

and said part B also having means near its upper end containing longitudinal slots therein, through which the arms of the U-shaped coupling means of bracket part A are designed to pass through, after which a padlock is passed through the two directly opposite holes of the U-shaped coupling means of the mounting bracket part A to complete the locking system for the push-broom.

3. A locking system according to claim 2 wherein the length of part B is from about 14 inches to about 17 inches.

4. A locking system according to claim 2 wherein said part B is attached to the push-broom by means of screws through holes in part B, one screw being attached to the push-broom at its wooden surface base containing the bristles, and the rest of part B being attached to the broom handle by means of three screws spaced from each other along the axis of the broom handle.

5. A locking system according to claim 2 wherein said part B is made of steel and is about 1 inch wide along its length, except for the means near its upper end containing the longitudinal slots therein which means is about 2¾ inches wide and wherein the longitudinal slots in same are about 1⅛ inches long and are each located outside the main axis of part B.

6. A locking system according to claim 2 wherein the overall length of part B is about 15 inches and wherein the thickness of part B is about ⅛ inch.

7. A locking system according to claim 2 wherein part A of same is attached to a tractor-trailer of a moving or shipping van.

* * * * *